United States Patent
Collins et al.

(10) Patent No.: US 11,718,008 B2
(45) Date of Patent: Aug. 8, 2023

(54) METHOD OF INJECTION MOLDING WITH DOWN CAVITY DETECTION

(71) Applicant: IMFLUX INC., Hamilton, OH (US)

(72) Inventors: Bryler Collins, Milford, OH (US); Brian Matthew Burns, Mason, OH (US); Gene Michael Altonen, West Chester, OH (US); Brandon Michael Birchmeier, Morrow, OH (US); Matthew Craver, Cincinnati, OH (US)

(73) Assignee: IMFLUX INC., Hamilton, OH (US)

( * ) Notice: Subject to any disclaimer, the term of this patent is extended or adjusted under 35 U.S.C. 154(b) by 204 days.

(21) Appl. No.: 17/324,299

(22) Filed: May 19, 2021

(65) Prior Publication Data

US 2021/0387393 A1 Dec. 16, 2021

Related U.S. Application Data (60) Provisional application No. 63/039,356, filed on Jun. 15, 2020.

(51) Int. Cl.
 *B29C 45/77* (2006.01)
 *B29C 45/50* (2006.01)
 (Continued)

(52) U.S. Cl.
 CPC .............. *B29C 45/77* (2013.01); *B29C 45/26* (2013.01); *B29C 45/50* (2013.01); *B29C 45/768* (2013.01);
 (Continued)

(58) Field of Classification Search
 CPC .......... B29C 45/768; B29C 2045/2683; B29C 2045/2687
 See application file for complete search history.

(56) References Cited

U.S. PATENT DOCUMENTS

| | | | |
|---|---|---|---|
| 2001/0019183 A1* | 9/2001 | Kishi | .................. B29C 45/7653 425/149 |
| 2016/0059461 A1 | 3/2016 | Altonen et al. | |
| 2016/0303787 A1 | 10/2016 | Bader | |

FOREIGN PATENT DOCUMENTS

| | | |
|---|---|---|
| JP | S57115835 A | 7/1982 |
| JP | H0760807 A | 3/1995 |
| JP | H0890622 A | 4/1996 |

OTHER PUBLICATIONS

Translation of JP H07-60807 (Year: 1995).*
International Application No. PCT/US2021/033058, International Search Report and Written Opinion, dated Jul. 26, 2021.

* cited by examiner

*Primary Examiner* — Xiao S Zhao
*Assistant Examiner* — John J DeRusso
(74) *Attorney, Agent, or Firm* — Marshall, Gerstein & Borun LLP (57) ABSTRACT

A method of detecting and compensating for a non-operational mold cavity in an injection molding apparatus having a plurality of mold cavities and an injection molding screw or ram includes injecting, via the injection molding screw or ram, a molten thermoplastic material into the plurality of mold cavities. The method includes measuring a first process parameter of the injection molding apparatus at a predetermined time during or after the injecting. The method also includes determining, based on the first process parameter, whether one or more mold cavities of the plurality of mold cavities are non-operational. Then, when it is determined that one or more mold cavities are non-operational, the method includes automatically adjusting the first process parameter or a second process parameter of the injection molding apparatus.

29 Claims, 4 Drawing Sheets

(51) Int. Cl.
   *B29C 45/80* (2006.01)
   *B29C 45/76* (2006.01)
   *B29C 45/26* (2006.01)
(52) U.S. Cl.
   CPC ...... *B29C 45/80* (2013.01); *B29C 2045/2683* (2013.01); *B29C 2945/76006* (2013.01); *B29C 2945/7621* (2013.01); *B29C 2945/76083* (2013.01); *B29C 2945/76187* (2013.01); *B29C 2945/76498* (2013.01); *B29C 2945/76568* (2013.01); *B29C 2945/76595* (2013.01); *B29C 2945/76665* (2013.01); *B29C 2945/76943* (2013.01)

METHOD OF INJECTION MOLDING WITH DOWN CAVITY DETECTION

CROSS-REFERENCE TO RELATED APPLICATION

This application claims the benefit of U.S. Provisional Application No. 63/039,356 filed Jun. 15, 2020, the entire contents of which are incorporated herein by reference in their entirety.

FIELD OF THE DISCLOSURE

The present disclosure generally relates to apparatuses and methods for injection molding and, more particularly, to apparatuses and methods for detecting and compensating for non-operational (e.g., blocked) cavities within a mold.

BACKGROUND

Injection molding is a technology commonly used for high-volume manufacturing of parts made of thermoplastic material. During a repetitive injection molding process, a thermoplastic resin, most often in the form of small beads or pellets, is introduced to an injection molding apparatus that melts the resin beads under heat and pressure. The now-molten resin is forcefully injected into a mold cavity having a particular cavity shape. The injected plastic is held under pressure in the mold cavity, cooled, and then removed as a solidified part having a shape that essentially duplicates the cavity shape of the mold. The mold itself may have a single cavity or multiple cavities.

An injection molding cycle, as used herein, or simply "cycle", can include the steps of (1) melting a shot of polymeric material; (2) clamping together two (or more) portions of a mold, such as a mold core and a mold cavity plate, that together form the mold walls that define one or more mold cavities (typically while the mold walls are in a cool condition relative to the temperature to which the molten thermoplastic material is heated prior to injection into the mold cavity); (3) injecting molten polymeric material into the one or more mold cavities; (4) packing or holding the material, i.e., applying one or more set pressures to the material, after the mold is full, to ensure adequate densification within the cavity and wait for material solidification in the gate(s) or runner(s) to prevent the material from flowing in the opposite direction through the gate(s) or runner(s); (5) waiting some period of time until the molded polymeric material cools to a temperature sufficient to eject the part, i.e. a temperature below its melt temperature, so that at least outside surfaces of the molded part are sufficiently solid so that the part will maintain its molded shape once ejected; (6) opening the portions of the mold that define the one or more mold cavities; (7) ejecting the molded part(s) from the one or more mold cavities; and (8) closing the two (or more) mold sections (for a subsequent cycle).

SUMMARY

The present disclosure describes a method of detecting at least one non-operational cavity in a multi-cavity mold during an injection molding cycle and automatically adjusting a process parameter of the injection molding cycle to compensate for the at least one non-operational cavity.

BRIEF DESCRIPTION OF THE DRAWINGS

The features of the present disclosure which are believed to be novel are set forth with particularity in the appended claims. The present disclosure may be best understood by reference to the following description taken in conjunction with the accompanying drawings, in which like reference numerals identify like elements in the several figures, in which:

DETAILED DESCRIPTION

Embodiments of the present invention generally relate to systems, machines, products, and methods of producing parts by injection molding and, more specifically, to systems, parts, and methods of detecting a non-operational cavity in a multi-cavity mold and automatically adjusting a process parameter to continue producing quality parts despite at least one cavity being non-operational.

As used herein, the phrase "process parameter" generally refers to a parameter of an injection molding apparatus that is at least partially responsible for the quality of a part created using a multi-cavity mold of that injection molding apparatus. For example, the "process parameter" can include, but is not limited to, a nozzle pressure of an injection nozzle of the injection molding apparatus, a position of a reciprocating screw disposed in the injection molding apparatus, a cushion of the molten thermoplastic material, a melt pressure of a molten thermoplastic material being injected into the multi-cavity mold of the injection molding apparatus, an expected travel of the reciprocating screw, a shot size of the thermoplastic material, an end-of-fill transition point such as a screw position set point and a time set point, or any other parameter that could affect the operation of the injection molding apparatus during the cycle or the quality of the product.

As used herein, the term "cavity percent fill" can refer to the percentage of the cavity that is filled on a volumetric basis, or the percentage of the cavity that is filled in relation to weight or mass of the molten material. For example, if a cavity is 95% filled, then the total volume of the mold cavity that is filled is 95% of the total volumetric capacity of the mold cavity. Alternatively, if a cavity is 95% filled, then the total weight of the material in the mold is equal to 95% of the weight specifications of a full part.

As used herein, the term "cushion" refers to a distance from a front of a check ring to an end of a barrel at an end of the injection molding cycle. The cushion is generally based on both the mold volume and the target shot size. For a given mold with constant volume, when the target shot size is increased, the cushion will increase as well. Conversely, when the target shot size is decreased, the cushion will decrease as well.

As used herein, the term "cycle time" is defined as a single iteration of an injection molding process that is required to fully form an injection molded part. Cycle time includes the collective time it takes to perform the steps of advancing molten thermoplastic material into a mold cavity, substantially filling the mold cavity with thermoplastic material, packing and/or holding pressure on the thermoplastic material within the cavity, cooling the thermoplastic material, separating first and second mold sides to expose the cooled thermoplastic material, removing the thermoplastic material, and closing the first and second mold sides.

As used herein, the terms "filled" and "full," when used with respect to a mold cavity including thermoplastic material, are interchangeable and both terms mean that thermoplastic material has reached the maximum volumetric capacity of the mold cavity.

As used herein, the phrase "flow front" refers to a leading edge of a shot of molten polymeric material, as experienced by the surfaces of the mold that define a mold cavity, as the molten polymeric material is progressing from a nozzle or gate of the mold cavity (i.e., a point or points of introduction of the molten polymeric material into the mold cavity) toward, and ultimately to, an end-of-fill location of the mold cavity.

As used herein, the phrase "flow rate" generally refers to the volumetric flow rate of polymer as measured at the injection nozzle. This flow rate can be calculated based on the injection rate, the compressibility of the thermoplastic material, the pressure experienced by thermoplastic material as measured at the injection nozzle, and the cross sectional area of the nozzle, or measured with a suitable sensor located in the injection nozzle.

As used herein, the phrase "melt temperature" generally refers to the temperature of the polymer that is maintained in the injection unit/barrel, and in the material feed system when a hot runner system is used, which keeps the polymer in a molten state. The melt temperature varies by material. However, a desired melt temperature is generally understood to fall within the ranges recommended by the material manufacturer.

As used herein, the term "mold simulator" is defined as a software simulator such as AUTODESK® MOLDFLOW® ADVISER™ by AUTODESK, INC., San Rafeal, Calif., used to simulate or model an injection molding cycle to determine a predicted or expected parameter of the injection molding apparatus during the subsequent actual injection molding cycle performed using the injection molding apparatus. The "mold simulator" may, for example, determine an expected position of the reciprocating screw or an expected location of a flow front of the molten thermoplastic material at fixed intervals of time. The "mold simulator" may also generate a pressure profile according to which an injection molding system might operate to achieve a selected flow front velocity profile. More specifically, the "mold simulator" may produce a model of a mold cavity with contour lines spaced along the length thereof, with the exact spacing depending on the selected profile. The contour lines may, for example, depict a flow front velocity throughout filling of the mold cavity that does not exceed a desired maximum or a flow front velocity that varies throughout filling of the mold cavity based on a custom flow front profile.

As used herein, the term "production version" refers to an injection molded part that is a "quality molded part."

As used herein, the term "quality molded part" refers to a molded part that satisfies one or more predetermined dimensional, performance, and/or aesthetic requirements within a defined tolerance range and is generally free of defects. Such dimensional requirements can include, but are not limited to, part lengths, widths, path lengths or perimeters, thickness, eccentricity, flatness or warp, parallelism, perpendicularity, and/or concentricity. Such performance requirements can include, but are not limited to, surviving and/or absorbing loads, such as tensile loads, compressive loads, torsional loads; exposure to vibration, surviving and/or absorbing electrical loads, and withstanding environmental exposures for a rated period of time. Additional performance requirements may include acoustic properties, such as, resonant frequencies, harmonics, and dampening behavior; and optical performance, such as percent transmission, dispersion, specularity, reflectance, and allowable aberrations. Aesthetic requirements can include, but are not limited to color, texture, surface texture, knit lines, blush, gap trap vestiges, markings, such as burn markings or freedom from undesired markings, and visible sink. Quality parts are also substantially free of defects, including, but not limited to lacking internal voids or containing only internal voids that do not compromise mechanical, electrical, or optical performance, substantially free of mold-in stress or have mold-in stress within a given tolerance, and substantially free of defects resulting from short shot or freeze-f during the molding process. Other requirements or part specification specified by a part customer are also within the contemplation of this definition. For example, the customer may require the molded part to have a given tensile and/or flexural moduli, impact resistance, hardness, chemical resistance and/or compatibility, abrasion resistance, thermal conductivity and/or resistivity, electrical conductivity and/or resistivity, reflectivity, specularity, clarity, percent transmission, index of refraction, and/or coefficient of friction.

As used herein, the term "shot size" generally refers to the volume of polymer to be injected from the injection unit/barrel to completely fill the mold cavity or cavities. The shot size is determined based on the temperature and pressure of the polymer in the injection unit/barrel just prior to injection. In other words, the shot size is a total volume of molten plastic material that is injected in a stroke of an injection molding screw or ram at a given temperature and pressure. Shot size may include injecting molten plastic material into one or more injection cavities through one or more gates. The shot of molten plastic material may also be prepared and injected by one or more injection units/barrels.

Figure 1:
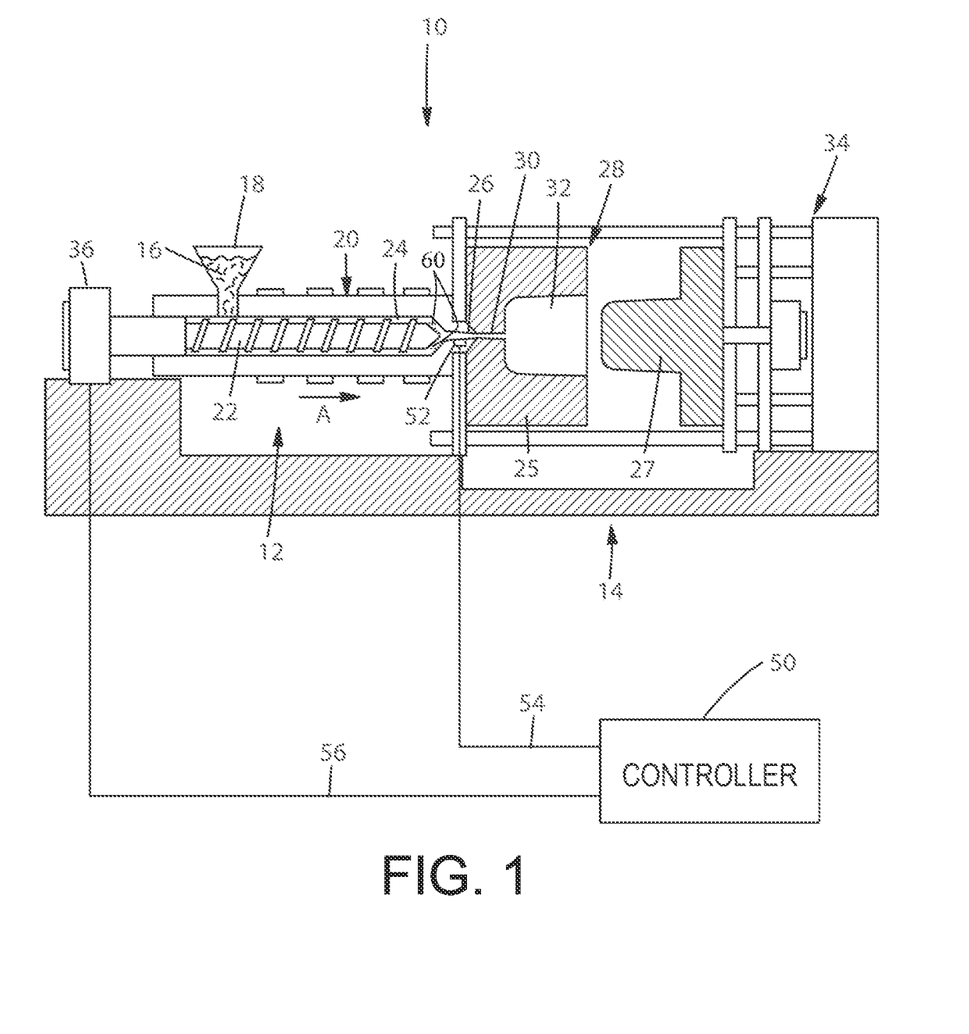
FIG. 1 illustrates a schematic view of one example of an injection molding apparatus, constructed according to the teachings of the present disclosure.

Referring to the figures in detail, FIG. 1 illustrates an exemplary injection molding apparatus 10 that generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a reciprocating screw 22. The heating of the heated barrel 20 and the compression of the thermoplastic pellets 16 by the reciprocating screw 22 causes the thermoplastic pellets 16 to melt, forming a molten thermoplastic material 24.

The reciprocating screw 22 forces the molten thermoplastic material 24 toward a nozzle 26 to form a shot of thermoplastic material, which will be injected into a mold cavity 32 of a mold 28 via one or more gates 30, preferably three or less gates, that direct the flow of the molten thermoplastic material 24 to the mold cavity 32. In other embodiments the nozzle 26 may be separated from one or more gates 30 by a feed system (not shown). The mold cavity 32 is formed between a first mold side 25 and a second mold side 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 as the material fills the mold cavity 32. The molten thermoplastic material 24 cools inside the mold cavity 32 until the thermoplastic material 24 solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 (e.g., eight, sixteen, 24, 48, 72 mold cavities) to increase overall production rates. For ease of reference, a mold 28 having a plurality of mold cavities 32 may be referred to as a "multi-cavity mold." The shapes of the cavities of the plurality of mold cavities 32 may be identical, similar or different from each other. (The latter may be considered a family of mold cavities 32).

A controller 50 is communicatively connected with a sensor 52, located in the vicinity of the nozzle 26, and a screw control 36. The controller 50 may include a microprocessor, a memory having at least one database stored thereon, and one or more communication links. The sensor 52 may provide an indication of when the thermoplastic material is approaching the end of fill in the mold cavity 32. The sensor 52 may sense the presence of thermoplastic material optically, acoustically, pneumatically, mechanically, electro-mechanically, or by otherwise sensing pressure and/or temperature of the thermoplastic material. When pressure or temperature of the thermoplastic material is measured by the sensor 52, this sensor 52 may send a signal indicative of the pressure or the temperature to the controller 50 to provide a target pressure for the controller 50 to maintain in the mold cavity 32 (or in the nozzle 26) as the fill is completed. This signal may generally be used to control the molding process, such that variations in material viscosity, mold temperatures, melt temperatures, and other variations influencing filling rate, are adjusted by the controller 50. These adjustments may be made immediately during the molding cycle, or corrections can be made in subsequent cycles. Furthermore, several signals may be used in calculations over a number of cycles and then used by the controller 50 to calculate adjustments to the molding cycle. The controller 50 may be connected to the sensor 52 and the screw control 36 via wired connections 54, 56, respectively. In other embodiments, the controller 50 may be connected to the sensors 52 and screw control 36 via a wireless connection, a mechanical connection, a hydraulic connection, a pneumatic connection, or any other type of communication connection known to those having ordinary skill in the art that will allow the controller 50 to communicate with the sensors 52 and the screw control 36.

In the embodiment of FIG. 1, the sensor 52 is a pressure sensor that measures (directly or indirectly) melt pressure of the molten thermoplastic material 24 in vicinity of the nozzle 26. The sensor 52 generates an electrical signal that is transmitted to the controller 50. The controller 50 then commands the screw control 36 to advance the screw 22 at a rate that maintains a desired melt pressure of the molten thermoplastic material 24 in the nozzle 26. While the sensor 52 may directly measure the melt pressure, the sensor 52 may also indirectly measure the melt pressure by measuring other characteristics of the molten thermoplastic material 24, such as temperature, viscosity, flow rate, etc., which are indicative of melt pressure. Likewise, the sensor 52 need not be located directly in the nozzle 26, but rather the sensor 52 may be located at any location within the injection system 12 or mold 28 that is fluidly connected with the nozzle 26. As an example, the sensor 52 may be located in the barrel 20 to measure the position of the reciprocating screw 22, the travel of the reciprocating screw 22, the cushion, or another process parameter. If the sensor 52 is not located within the nozzle 26, appropriate correction factors may be applied to the measured characteristic to calculate an estimate of the melt pressure in the nozzle 26. The sensor 52 need not be in direct contact with the injected fluid and may alternatively be in dynamic communication with the fluid and able to sense the pressure of the fluid and/or other fluid characteristics. In yet other embodiments, the sensor 52 need not be disposed at a location that is fluidly connected with the nozzle. Rather, the sensor 52 could measure clamping force generated by the clamping system 14 at a mold parting line between the first and second mold parts 25, 27. In one aspect, the controller 50 may maintain the pressure according to the input from sensor 52. Alternatively, the sensor 52 could measure an electrical power demand by an electric press, which may be used to calculate an estimate of the pressure in the nozzle.

In an injection molding system, the location of the flow front of the molten polymeric material can be detected at desired locations within the mold cavity 32. As described above, the fact that the flow front has reached a particular location in the mold cavity 32 may be detected by a sensor 52. For instance, the sensor 52 may take the form of a pressure transducer and may use vacuum pressure. One or more temperature sensors, such as thermal resistors, could be used instead of or in addition to a pressure sensor to determine or verify that the flow front has reached a given location of a mold cavity 32. Such a sensor 52 may operate by either sensing temperature or pressure, or by sensing a lack thereof. For instance, the sensor could sense a flow of air, and upon interruption, the sensor 52 may detect that interruption and communicate to the controller 50 that the air flow has been interrupted. Alternatively, or additionally, the location of the flow front may be determined based on time, screw position (e.g., monitored using a potentiometer), hydraulic pressure, the velocity of the flow front, or some other process characteristic. As an example, the location of the flow front can be determined by monitoring the screw position, which when analyzed over time, can be used to calculate the volume of thermoplastic material in the mold 28. As illustrated in FIG. 1, the pressure injection molding apparatus 10 further includes a check ring 60 coupled (e.g., attached) to a portion of the reciprocating screw 22 within the barrel 20. In the example illustrated in FIG. 1, the check ring 60 is coupled to the reciprocating screw 22 at a position proximate to an end 62 of the reciprocating screw 22. The check ring 60 is generally configured to prevent, or at least limit, a backflow of the molten thermoplastic material 24, i.e., the molten thermoplastic material 24 from flowing in a direction from the nozzle 26 toward the hopper 18. As an example, the check ring 60 may be configured to allow a backflow of to less than 10%, less than 9%, less than 8%, less than 7%, less than 6%, less than 5%, less than 4%, less than 3%, less than 2%, or less than 1% of the target shot size for the molten thermoplastic material 24.

During operation of the pressure injection molding apparatus 10, it is possible that one or more cavities 32 in a multi-cavity mold 28 may become non-operational (e.g., blocked). For example, the molten thermoplastic material 24 entering the multi-cavity mold 28 may cool quicker than expected and solidify before the entire cavity is filled with the molten thermoplastic material 24. As a result, the molten thermoplastic material 24 may cool and solidify in the gate of one of the cavities 32 or in an area within one of the cavities 32 proximate the gate, thereby blocking that cavity 32. However, some conventional multi-cavity molds 28 do not include a feedback mechanism that is disposed within the non-operational cavity 32 and indicates that the cavity 32 is non-operational. For this reason, some conventional multi-cavity molds 28 do have such a feedback mechanism, in the form of a sensor disposed in each cavity 32 of the multi-cavity mold 28. However, disposing a sensor in each cavity 32 of the multi-cavity mold 28 is quite costly to install, maintain, and repair.

In any event, when the controller 50 of the injection system 12 lacks any indication that one or more of the cavities 32 is non-operational, the reciprocating screw 22 of the injection system 12 continues to inject the same amount of molten thermoplastic material 24 into each cavity 32 of the multi-cavity mold 28, even though one or more of these cavities 32 is non-operational. Consequently, the reciprocating screw 22 continues to advance toward the forward most position of the reciprocating screw 22 thereby injecting, or attempting to inject, the material into the remaining operational cavities 32. This can, in turn, lead to an excess amount of material being injected into one or more of the operational cavities 32, thereby resulting in flashing to one or more parts produced by the multi-cavity mold 28. The present disclosure aims to prevent this problem by detecting when one or more cavities 32 are non-operational without the use of sensors disposed in each of the cavities 32 or without the use of sensors disposed in any of the cavities 32 in the multi-cavity mold 28, and automatically adjusting a process parameter of the injection system 12 to compensate for the non-operational cavity, thereby maintaining the quality of the products and limiting downtime for repairs.

Figure 2:
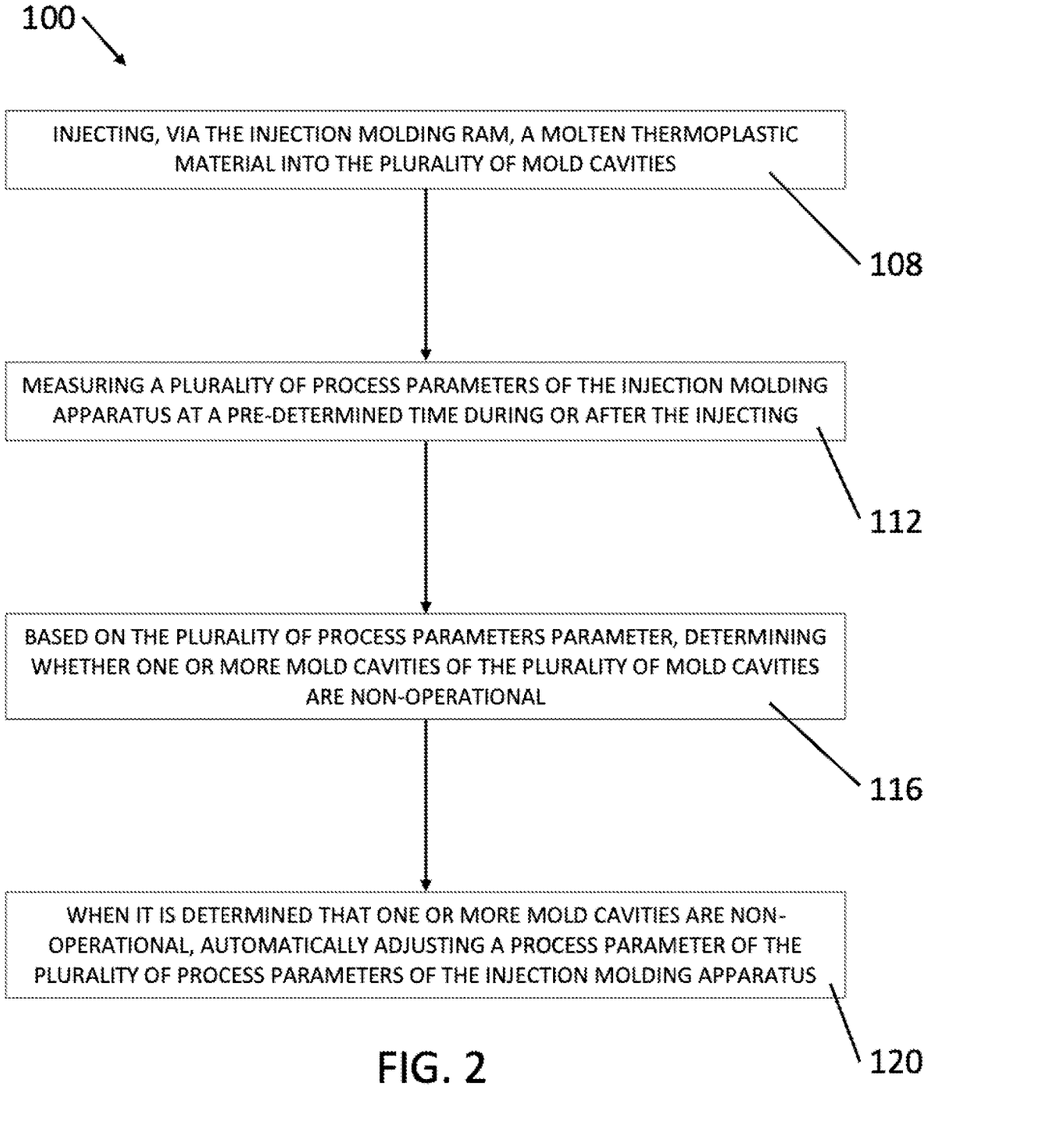
FIG. 2 is a flow chart depicting one example of a method of detecting and automatically adjusting for a non-operational cavity in a multi-cavity mold of the constant pressure injection molding apparatus of FIG. 1.

FIG. 2 illustrates an example of a method 100 respectively, of detecting and compensating for one or more non-operational mold cavities in the injection molding apparatus 10. The method 100 generally includes the steps of: (1) injecting, via the reciprocating screw 22, the molten thermoplastic material into the mold cavities 32 (block 108), (2) measuring a first process parameter of the injection molding apparatus at a pre-determined time during or after the injecting (block 112), (3) based on the first process parameter, determining whether one or more mold cavities 32 are non-operational (block 116), and (4) when it is determined that one or more mold cavities are non-operational, automatically adjusting the first process parameter or a second process parameter of the injection molding apparatus 10 (block 120).

In some examples, the method 100 includes determining (e.g., calculating, recording), using the controller 50, or another computing device, one or more expected (or desired) process parameters at one or more pre-determined times during the injecting. The expected process parameters are generally determined based on the specifications of the part to be produced, such as, for example, the type of thermoplastic material from which the part is to be made, the overall dimensions of the product (e.g., height, width, length, radius, diameter, etc.), the amount of parts to be made (i.e., the amount of cavities in the multi-cavity mold), the specifications of the injection molding apparatus 10, one or more previous injection cycles performed using the injection molding apparatus 10 (or another injection molding apparatus) to produce quality molded parts, simulated injection cycles performed using a mold simulator, or combinations thereof. For example, the controller 50 may determine the expected (or desired) melt pressure of the molten thermoplastic material 24 in the nozzle 26 during the injecting. As another example, the controller 50 may determine the expected (or desired) position of the reciprocating screw 22 prior to the beginning of the injecting and at another point in time during or after the injecting. As yet another example, the controller 50 may determine the expected cushion (i.e., the amount of molten thermoplastic material 24 that should be disposed between the check ring 60 and an end of the barrel 20 at the end of the injecting). The process parameter may also be an end-of-fill transition point, such as a screw position set point or a time set point. For example, adjusting the process parameter can involve adjusting the end-of-fill transition point from a first pressure to a second pressure. The second pressure being lower than the first pressure.

Once the expected process parameters are determined, the expected process parameters may be stored in an expected parameters database stored in the memory of the controller 50 (or another computing device), to be later accessed by the controller 50. In some cases, it may be beneficial to populate the expected parameters database with a plurality of different expected process parameters and/or a plurality of expected values for one or more process parameters. For example, the expected parameters database may be populated with a plurality of expected cushion values. Doing so may provide an operator, programmer, or the controller 50 with a range of acceptable or expected parameters for various process parameters. In some cases, the controller 50 may associate a timestamp with each expected parameter.

During the injecting, which may, for example, be performed based on substantially constant low pressure, the molten thermoplastic material 24 is injected into the cavities 32, one or more of which may be non-operational. During or after the injecting, the controller 50 measures a plurality of process parameters of the injection molding apparatus 10 at the one or more pre-determined times, which in some cases will correspond to the pre-determined times associated with the expected process parameters stored in the expected parameter database. The controller 50 measures the plurality of process parameters using the sensor 52 and any other sensors employed in the injection molding apparatus 10. The controller 50 can, for example, measure the actual position of the reciprocating screw 22 at one or more pre-determined times during or after the injecting (e.g., at each timestamp that the controller 50 determined the expected position of the reciprocating screw 22). The controller 50 can measure the actual cushion 64 of the molten thermoplastic material 24 at one or more pre-determined times during or after the injecting (e.g., at each timestamp that the controller 50 determined the expected cushion 64 of the molten thermoplastic material 24). The controller 50 can likewise measure the actual melt pressure of the molten thermoplastic material 24 toward the nozzle 26 at one or more pre-determined times during or after the injecting (e.g., at each timestamp that the controller 50 determined the expected melt pressure of the molten thermoplastic material 241. Finally, the controller 50 can measure the actual travel of the reciprocating screw 22 at one or more pre-determined times during or after the injecting (e.g., at each timestamp that the controller 50 determined the expected travel of the reciprocating screw 22).

Unlike conventional injection molding processes, which, as discussed above, may not include a feedback system or have a feedback system that is malfunctioning, the injection molding apparatus 10 of the present disclosure may determine whether one or more cavities 32 in the plurality of cavities 32 are non-operational without the use of any sensors disposed in the cavities 32. More particularly, the controller 50 (or another computing device) determines whether one or more cavities 32 are non-operational based on the measured process parameters. In some cases, this determination may be based solely on the measured process parameters. As an example, this determination may be made by comparing one of the measured process parameters at several different points in time during the injecting, whereby a deviation in the values between the measured process parameters may be indicative of one or more cavities 32 being non-operational. As an example, during the injecting, the melt pressure of the molten thermoplastic material 24 should be steady or consistent throughout the injecting; thus, fluctuations in the melt pressure values at various pre-determined times during the injecting may indicate that at least one cavity 32 is non-operational. In other cases, this determination may be based on a comparison between one or more expected parameters stored in the expected parameter database to one or more corresponding actual process parameters measured by the controller 50. In particular, the controller 50 compares the one or more expected parameters to the one or more corresponding actual parameters measured, and based on that comparison, determines whether there exists a difference, between the expected parameter(s) and the corresponding actual parameter(s). In some cases, a difference of any amount will indicate that one or more cavities 32 are non-operational. As an example, when the actual cushion 64 is greater than the expected cushion 64, the controller 50 determines that one or more cavities 32 are non-operational. Notably, when the actual cushion 64 is greater than the expected cushion 64, the difference between the two may be indicative of how many cavities 32 are non-operational. In other cases, the controller 50 may compare the difference to a threshold difference; when the difference exceeds the threshold difference, the controller 50 determines that one or more cavities 32 are non-operational, whereas when the difference is less than the threshold difference, the controller 50 determines that all of the cavities 32 are operational.

When the controller 50 determines that one or more of the cavities 32 are non-operational, the controller 50 (or another computing device) automatically adjusts one or more process parameters (e.g., the melt pressure of the molten thermoplastic material 24) of the injection molding apparatus 10 to compensate for the non-operational cavity(ies) 32 without slowing down production or sacrificing quality of the molded part. The controller 50 may, in some cases, automatically adjust the same parameter(s) used to determine that the one or more of the cavities 32 are non-operational in the first place. In other cases, however, the controller 50 may automatically adjust one or more different parameters than the parameters used to determine that the one or more of the cavities 32 are non-operational.

Figure 3A:
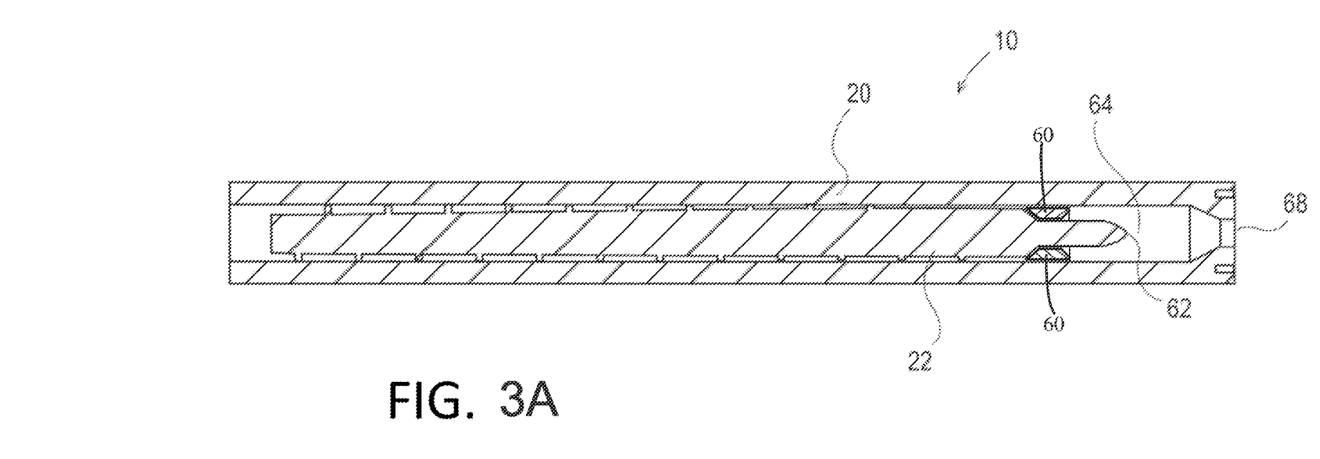
FIG. 3A is a cross-sectional view of a barrel of the injection molding apparatus of FIG. 1, showing an actual positon of the reciprocating screw of the injection molding apparatus.
Figure 3B:
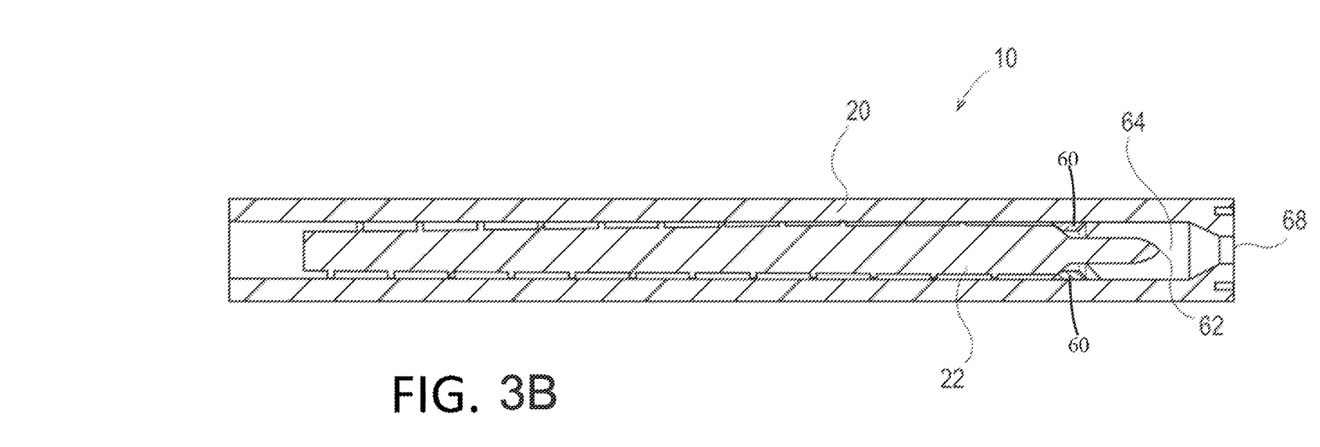
FIG. 3B is similar to FIG. 3A, but shows an expected position of the reciprocating screw.
Figure 4A:
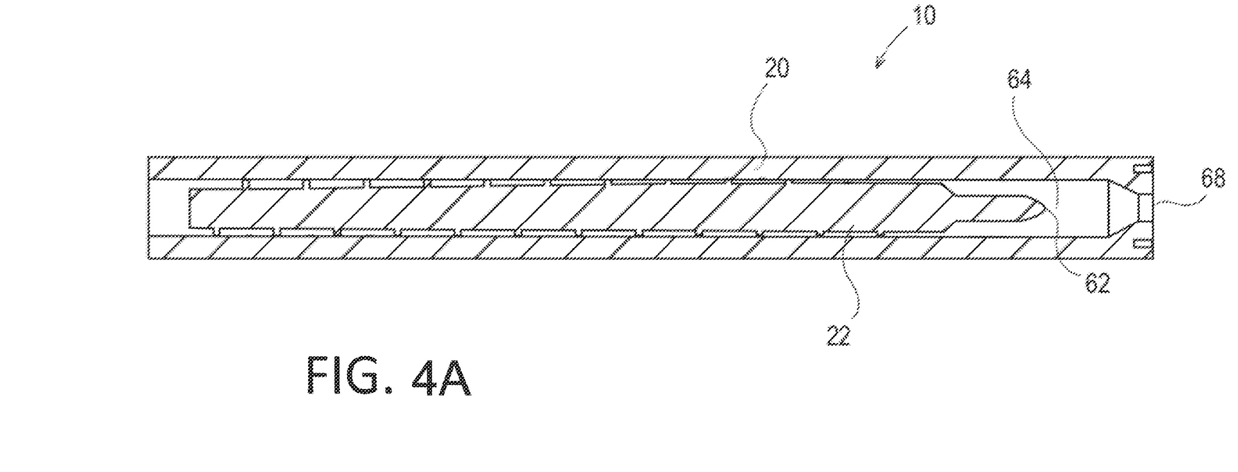
FIG. 4A is a cross-sectional view of a barrel of the injection molding apparatus of FIG. 1, showing the actual cushion.
Figure 4B:
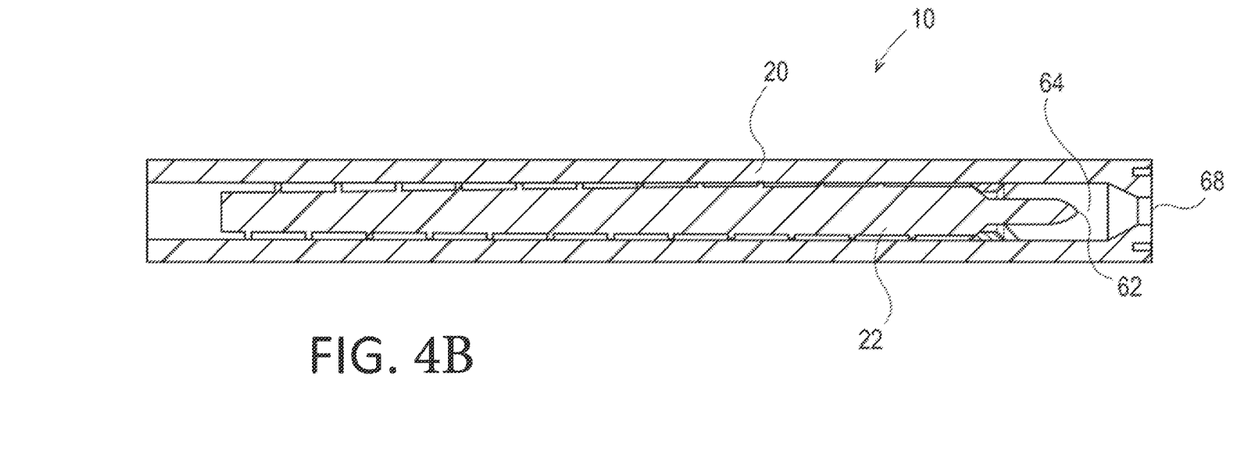
FIG. 4B is similar to FIG. 4A, but shows the expected cushion.

FIGS. 3A-4B illustrate examples of how the injection molding apparatus 10 described above can be used to determine whether one or more cavities 32 are non-operational and, in response to the detecting, to adjust a process parameter to compensate for at least one non-operational cavity. FIGS. 3A and 3B illustrate an actual position of the reciprocating screw 22 and an expected position of the reciprocating screw 22, respectively. FIGS. 4A and 4B illustrate an actual cushion 64 of the molten thermoplastic material 24 and an expected cushion 64 of the molten thermoplastic material 24, respectively.

FIG. 3A illustrates an example actual parameter in the form of an actual position of the reciprocating screw 22 at a pre-determined time during the injecting. In other words, the reciprocating screw 22 is actually in the location illustrated in FIG. 3A at this pre-determined time during the injecting. In turn, the controller 50 compares the actual position of the reciprocating screw 22 to the expected position of the reciprocating screw 22 at the same pre-determined time during the injecting, which is illustrated in FIG. 3B. As evidenced by FIG. 3B, the expected position of the reciprocating screw 22 is different from the actual position of the reciprocating screw 22 illustrated in FIG. 3A. In fact, the actual position of the reciprocating screw 22 is further from the end of the barrel 20 than expected. Accordingly, the controller 50 may determine that one or more cavities 32 is non-operational and may respond by adjusting a process parameter of the plurality of process parameters to compensate for the non-operational cavity(ies). The controller 50 may use a machine learning algorithm to, based on the process parameter to be adjusted, adjust operation of the injection molding apparatus to compensate for the non-operational cavity(ies).

FIG. 4A illustrates an example actual cushion 64 of the molten thermoplastic material 24, which is measured by the distance from a front end 62 of the reciprocating screw 22 to an end 68 of the barrel 22 of the injection molding apparatus 10, at a pre-determined time during the injecting. The cushion 64 of the molten thermoplastic material 24 is expected to have the particular length illustrated in FIG. 4B at this pre-determined time during the injecting. In turn, the controller 50 compares the actual cushion 64 of the molten thermoplastic material 24 to the expected cushion 64 of the molten thermoplastic material 24 during the injecting, which is illustrated in FIG. 4B. As evidenced by FIG. 4A, the actual cushion 64 of the molten thermoplastic material 24 is different from the expected cushion 64 of the molten thermoplastic material 24 illustrated in FIG. 4B. In fact, the actual cushion 64 of the molten thermoplastic material 24 is greater than expected. Accordingly, the controller 50 may determine that one or more cavities 32 is non-operational and may respond by adjusting a process parameter of the plurality of process parameters to compensate for the non-operational cavity(ies). The controller 50 may use a machine learning algorithm to, based on the process parameter to be adjusted, adjust operation of the injection molding apparatus to compensate for the non-operational cavity(ies).

It will be appreciated from the foregoing that in spite of the fact that at least one cavity 32 of the multi-cavity mold 28 may be or become non-operational, the injection molding apparatus 10 described herein can continue to perform the current injection molding cycle and subsequent injection molding cycles as part of the same injection molding run, all while continuing to make or yield production versions of the same injection molded part in the remaining operational cavities 32.

Although a thermoplastic injection molding process is described herein, the embodiments in this disclosure may also relate to other injection molding processes. Other injection molding processes include metal injection molding ("MIM"), reaction injection molding ("RIM"), liquid injection molding ("LIM"), structural foam molding, and liquid crystal polymer ("LCP") molding.

We claim:

1. A method of detecting and compensating for a non-operational mold cavity in an injection molding apparatus having a plurality of mold cavities and an injection molding screw or ram, the method comprising:
   injecting, via the injection molding screw or ram, a molten thermoplastic material into the plurality of mold cavities;
   measuring a first process parameter of the injection molding apparatus at a pre-determined time during or after the injecting, the measuring of the first process parameter comprising measuring a position of the injection molding screw or ram;
   based on the first process parameter, determining whether one or more mold cavities of the plurality of mold cavities are non-operational; and
   when it is determined that one or more mold cavities are non-operational, automatically adjusting the first process parameter or a second process parameter of the injection molding apparatus.

2. The method of claim 1, further comprising:
   comparing the measured position to an expected position corresponding to all of the plurality of mold cavities being operational; and
   when a difference between the measured position and the expected position is greater than a predetermined threshold, generating a signal indicative of at least one mold cavity of the plurality of mold cavities being non-operational.

3. The method of claim 1, wherein automatically adjusting the first process parameter or the second process parameter comprises adjusting a melt pressure of the molten thermoplastic material.

4. The method of claim 3, wherein automatically adjusting the melt pressure of the molten thermoplastic material comprises decreasing the melt pressure of the molten thermoplastic material.

5. The method of claim 1, wherein automatically adjusting the first process parameter or the second process parameter comprises adjusting an end-of-fill transition point from a first pressure to a second pressure, the second pressure being lower than the first pressure.

6. The method of claim 5, wherein automatically adjusting the end-of-fill transition point comprises adjusting a screw position set point or a time set point.

7. The method of claim 1, wherein determining whether the one or more mold cavities are non-operational comprises determining whether the one or more mold cavities are non-operational without using any cavity pressure sensors within the plurality of mold cavities.

8. The method of claim 1, wherein after the adjusting, further comprising injecting, via the injection molding screw or ram, the molten thermoplastic material into the plurality of mold cavities at the adjusted process parameter.

9. A method of detecting and compensating for a non-operational mold cavity in an injection molding apparatus having a plurality of mold cavities and an injection molding screw or ram, the method comprising:
   determining an expected parameter of the injection molding apparatus at a pre-determined time during or after an injection molding cycle comprising injecting a molten thermoplastic material into the plurality of mold cavities;
   injecting, via the injection molding screw or ram, the molten thermoplastic material into the plurality of mold cavities;
   determining an actual parameter of the injection molding apparatus at the pre-determined time during or after the injection molding cycle;
   based on determining the actual parameter, determining a parameter differential between the expected parameter and the actual parameter;
   based on the parameter differential between the expected parameter and the actual parameter, determining whether one or more mold cavities of the plurality of mold cavities are non-operational; and
   when it is determined that one or more mold cavities are non-operational, adjusting a process parameter of the injection molding apparatus based at least in part on the parameter differential.

10. The method of claim 9, wherein determining the expected parameter comprises: simulating, using a flow model simulator, the injecting prior to the injecting; and determining the expected parameter at the pre-determined time based on the simulated injection.

11. The method of claim 9, wherein adjusting the process parameter of the injection molding apparatus comprises adjusting a melt pressure of the molten thermoplastic material.

12. The method of claim 11, wherein adjusting the melt pressure of the molten thermoplastic material comprises decreasing the melt pressure of the molten thermoplastic material based at least in part on the parameter differential.

13. The method of claim 9, wherein adjusting the process parameter of the injection molding apparatus comprises adjusting an end-of-fill transition point from a first pressure to a second pressure, the second pressure being lower than the first pressure.

14. The method of claim 13, wherein adjusting the end-of-fill transition point comprises adjusting a screw position set point or a time set point.

15. The method of claim 9, wherein determining the expected parameter comprises determining an expected nozzle pressure of an injection nozzle of the injection molding apparatus at the pre-determined time, and wherein determining the actual parameter comprises determining an actual nozzle pressure of the injection nozzle of the injection molding apparatus at the pre-determined time via a sensor disposed proximate the injection nozzle.

16. The method of claim 9, wherein determining the expected parameter comprises determining an expected position of the injection molding screw or ram of the injection molding apparatus, and wherein determining the actual parameter comprises determining an actual position of the injection molding screw or ram of the injection molding apparatus.

17. The method of claim 9, wherein determining the expected parameter comprises determining an expected cushion of the molten thermoplastic material at the pre-determined time, measured from a front of the injection molding screw or ram to an end of a barrel of the injection molding apparatus, and wherein determining the actual parameter comprises determining an actual cushion of the molten thermoplastic material at the pre-determined time.

18. The method of claim 9, wherein determining the expected parameter comprises determining an expected melt pressure at the pre-determined time, and wherein determining the actual parameter comprises determining an actual melt pressure at the pre-determined time via a sensor disposed proximate the injection molding screw or ram.

19. The method of claim 9, wherein determining whether the one or more mold cavities are non-operational comprises determining whether the one or more mold cavities are non-operational without using any cavity pressure sensors within the plurality of mold cavities.

20. The method of claim 9, wherein after the adjusting, further comprising injecting, via the injection molding screw or ram, the molten thermoplastic material into the plurality of mold cavities at the adjusted process parameter.

21. A method of detecting and compensating for a non-operational mold cavity in an injection molding apparatus having a plurality of mold cavities and an injection molding screw or ram, the method comprising:
- determining an expected position of the injection molding screw or ram at a pre-determined time during or after an injection molding cycle comprising injecting a molten thermoplastic material into the plurality of mold cavities;
- injecting, via the injection molding screw or ram, the molten thermoplastic material into the plurality of mold cavities;
- determining an actual position of the injection molding screw or ram at the pre-determined time during or after the injection molding cycle;
- based on a position differential between the expected position and the actual position, determining whether one or more mold cavities of the plurality of mold cavities are non-operational; and
- when it is determined that one or more mold cavities are non-operational, adjusting a process parameter of the injection molding apparatus based at least in part on the position differential.

22. The method of claim 21, wherein determining the expected position comprises: simulating, using a flow model simulator, the injecting prior to the injecting; and determining the expected position at the pre-determined time based on the simulated injection.

23. The method of claim 21, wherein adjusting the process parameter of the injection molding apparatus comprises adjusting a melt pressure of the molten thermoplastic material.

24. The method of claim 23, wherein adjusting the melt pressure comprises decreasing the melt pressure.

25. The method of claim 21, wherein adjusting the process parameter of the injection molding apparatus comprises adjusting a velocity of the injection molding screw or ram during the injecting.

26. The method of claim 21, wherein adjusting the process parameter of the injection molding apparatus comprises adjusting an end-of-fill transition point from a first pressure to a second pressure, the second pressure being lower than the first pressure.

27. The method of claim 26, wherein adjusting the end-of-fill transition point comprises adjustments to a screw position set point or a time set point.

28. The method of claim 21, further comprising issuing an alert when it is determined that the one or more mold cavities are non-operational.

29. The method of claim 21, wherein determining whether the one or more mold cavities are non-operational comprises determining whether the one or more cavities are non-operational without using any cavity pressure sensors within the plurality of mold cavities.

* * * * *